United States Patent [19]

Cooper

[11] Patent Number: 5,123,944
[45] Date of Patent: Jun. 23, 1992

[54] REMOVABLE FILTER UNITS

[75] Inventor: Stuart O. Cooper, Queniborough, England

[73] Assignee: BTR plc, London, United Kingdom

[21] Appl. No.: 629,605

[22] Filed: Dec. 18, 1990

[30] Foreign Application Priority Data

Dec. 23, 1989 [GB] United Kingdom ............... 8929176

[51] Int. Cl.$^5$ ............................................. B01D 46/00
[52] U.S. Cl. ........................................ 55/378; 55/483; 55/502; 55/304; 55/341.1
[58] Field of Search .............. 55/378, 381, 379, 382, 55/483, 484, 304, 305, 341.1, 502

[56] References Cited

U.S. PATENT DOCUMENTS

| | | | |
|---|---|---|---|
| 1,747,131 | 2/1930 | Parsons | 55/378 |
| 2,640,560 | 6/1953 | Lewis et al. | 55/341.1 |
| 4,735,638 | 4/1988 | Ciliberti et al. | 55/302 |

FOREIGN PATENT DOCUMENTS

| | | |
|---|---|---|
| 0257793 | 3/1988 | European Pat. Off. . |
| 8629362 | 12/1987 | Fed. Rep. of Germany . |
| 817607 | 8/1959 | United Kingdom . |
| 931062 | 7/1963 | United Kingdom . |
| 1039317 | 8/1966 | United Kingdom . |
| 2137110 | 10/1984 | United Kingdom . |

*Primary Examiner*—Bernard Nozick
*Attorney, Agent, or Firm*—Stevens, Davis, Miller & Mosher

[57] ABSTRACT

To facilitate removal and insertion of filter units from a filter frame structure without need to gain access to the dust side of the filter assembly there is provided a filter frame structure having a support plate formed with openings through which filter units may pass and support bars underneath the support plate to support each filter unit in the region of a respective opening. A removable seal plate is arranged therewith and clamp means is provided for lifting the filter units from the support bars to bring them into sealing engagement with the underside of the seal plate.

10 Claims, 7 Drawing Sheets

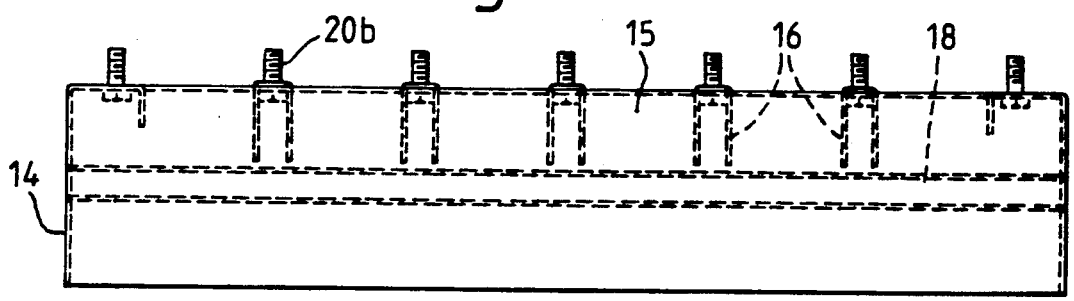
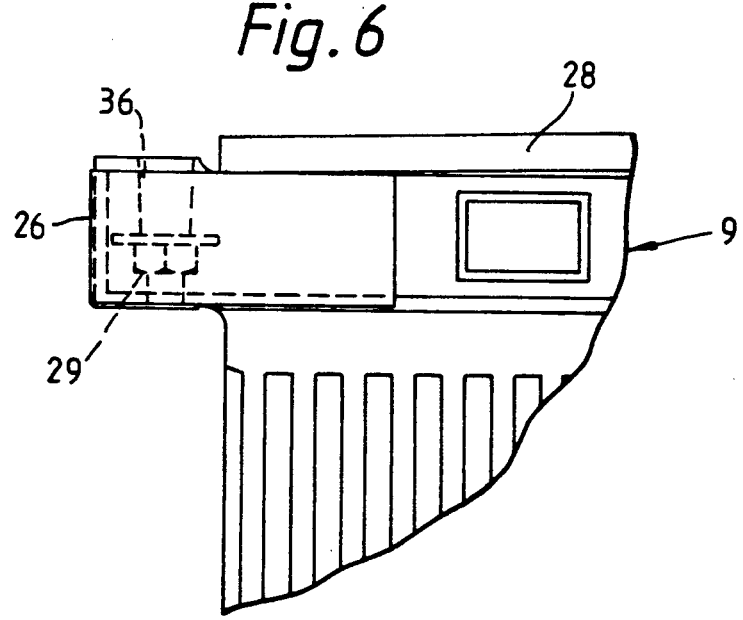

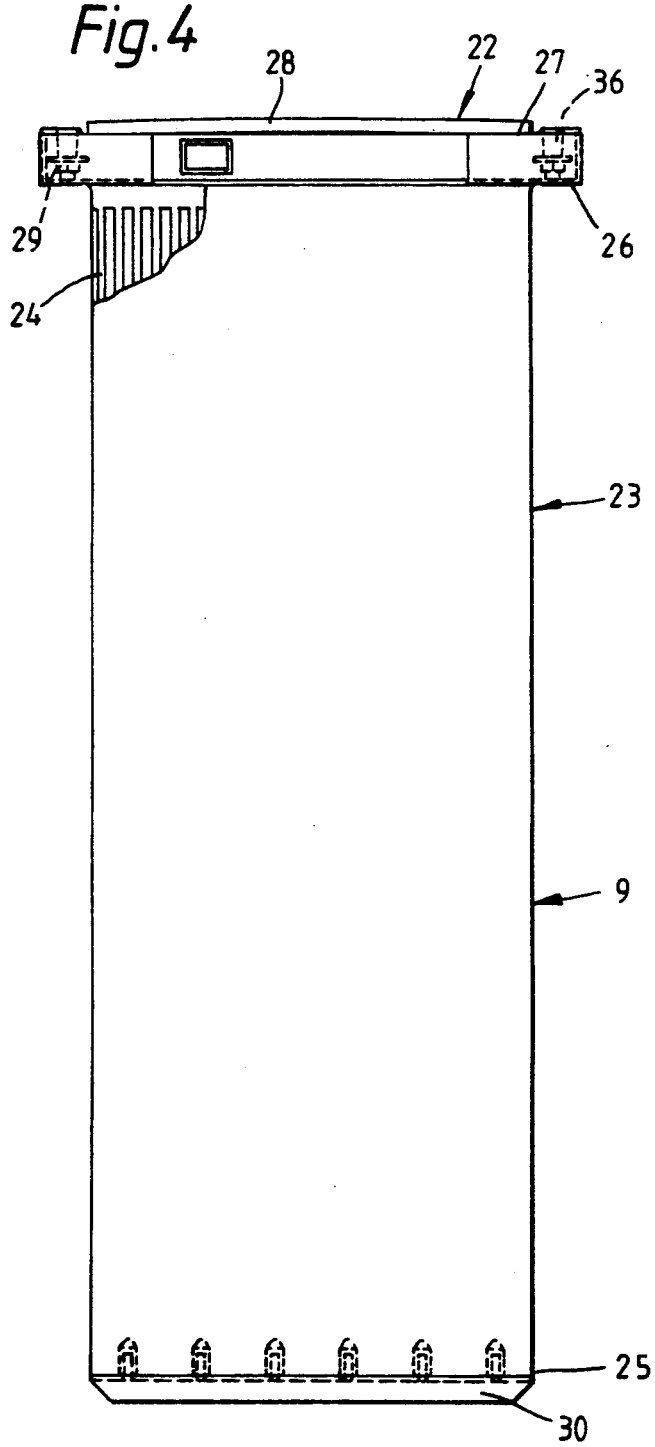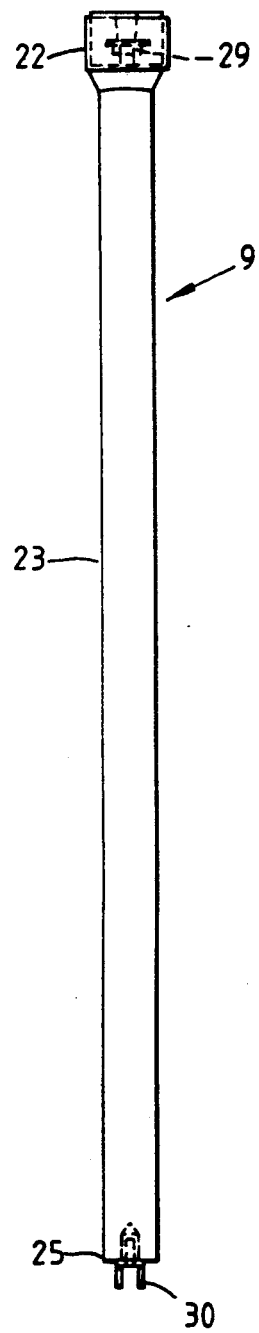

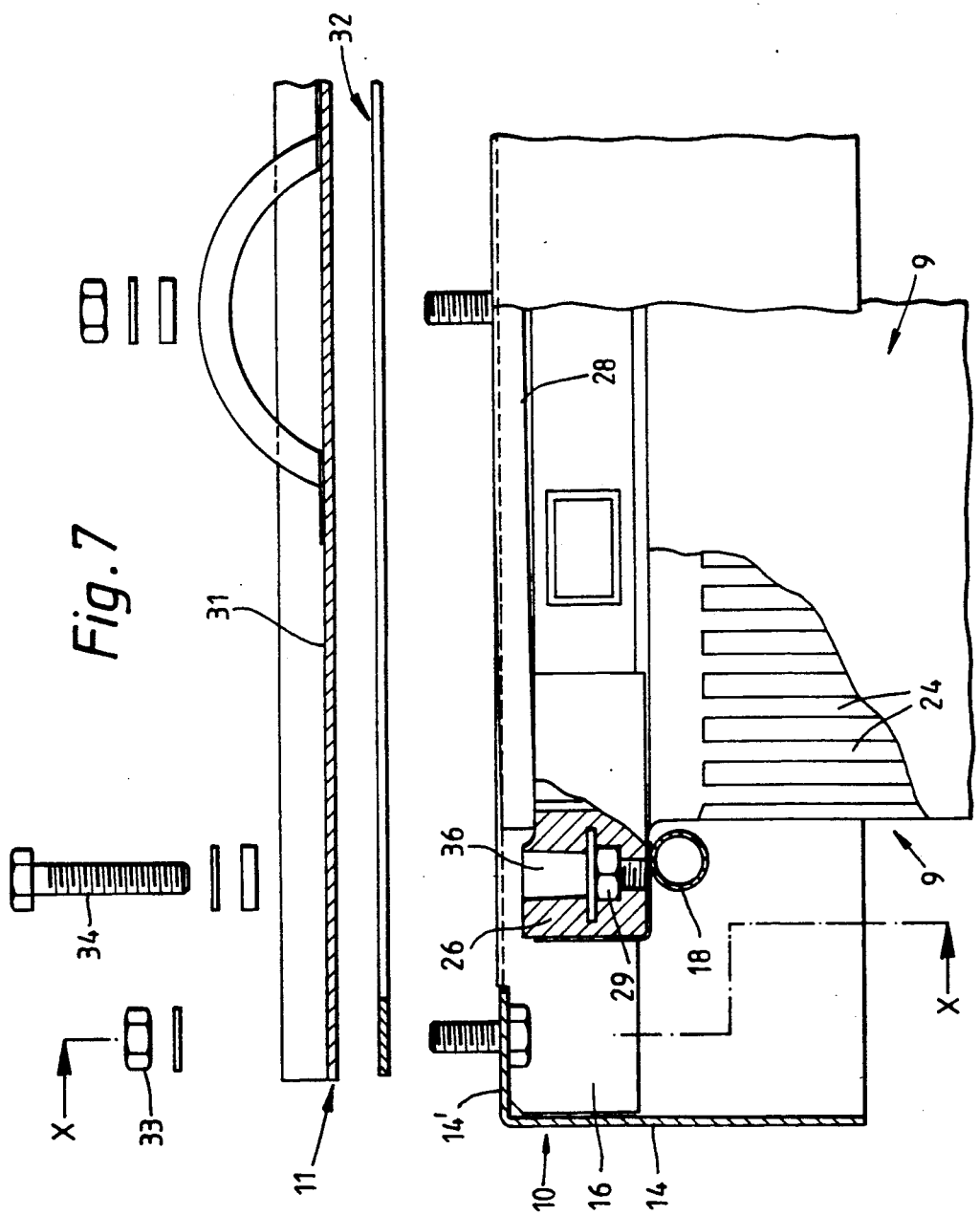

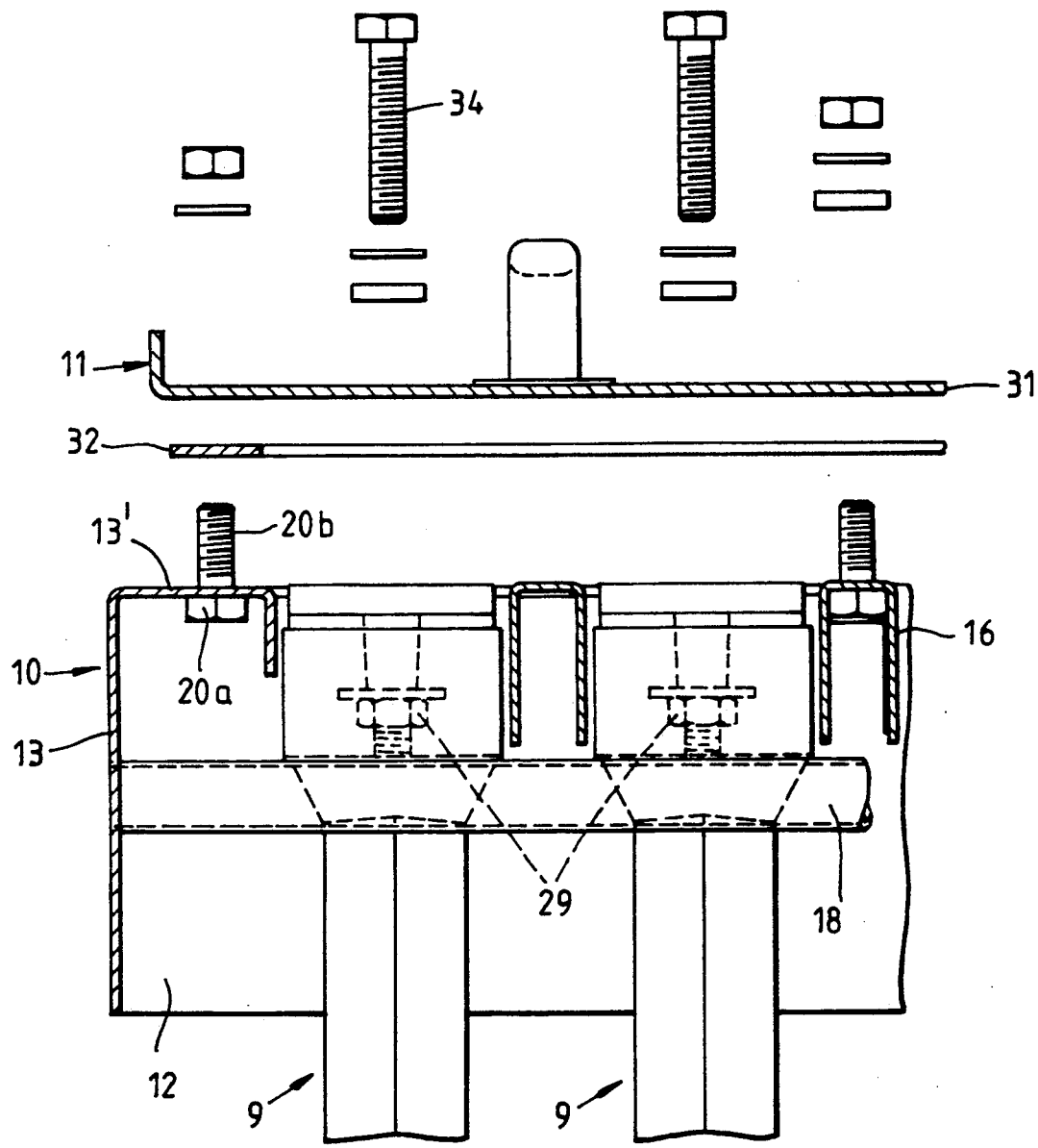

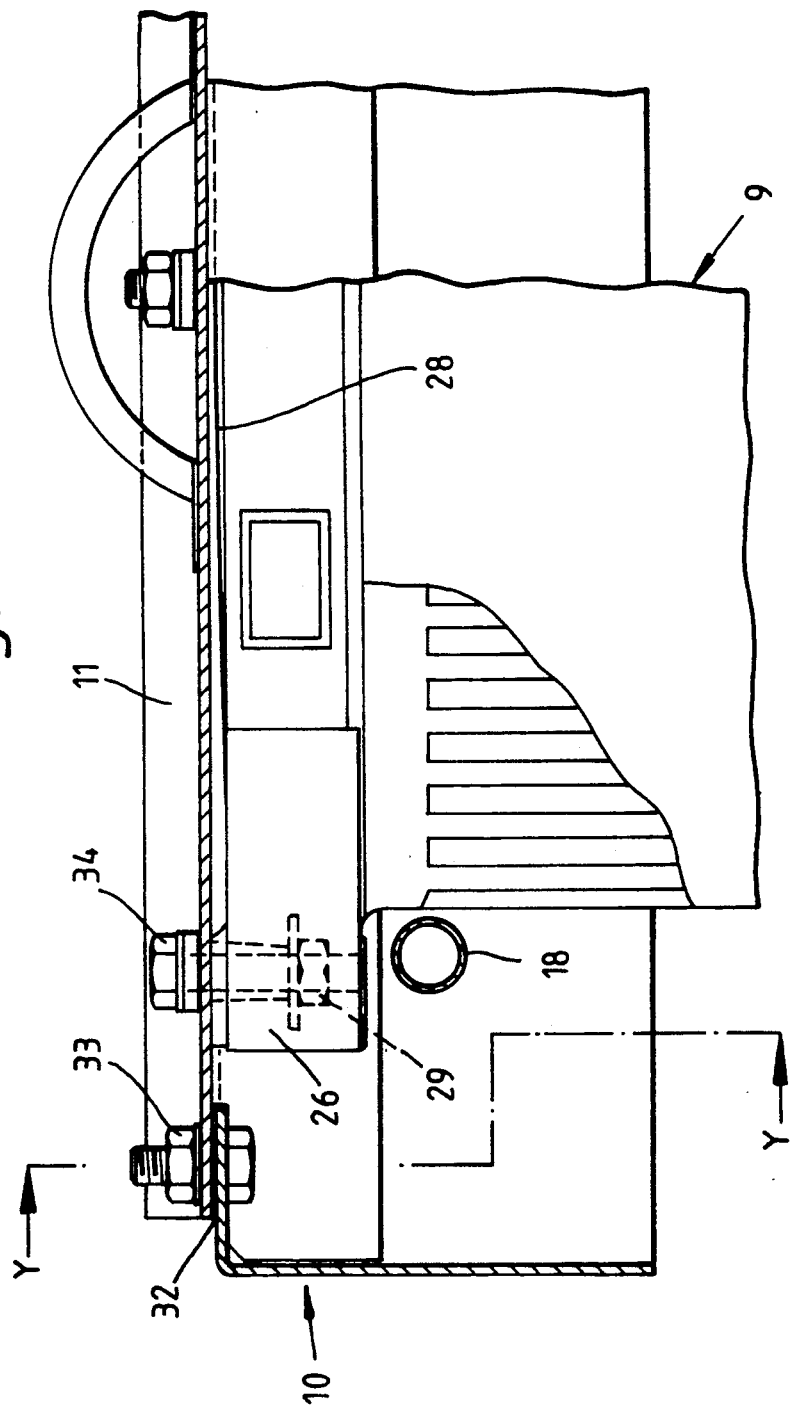

REMOVABLE FILTER UNITS

This invention relates to a removable filter unit and to a filter sub-assembly comprising a filter frame having a plurality of removable filter units sealingly secured thereto. The invention relates in particular, although not exclusively, to a filter unit and to a filter sub-assembly comprising one or more filter units of a type in which the filter material is of a substantially rigid nature.

Commonly a filter assembly comprises a housing having air inlet and outlet apertures and a filter sub-assembly positioned in the housing to lie in the air flow path between the inlet and outlet apertures. The sub-assembly generally comprises a filter unit frame secured at its periphery in fluid tight manner to the housing, the frame having a series of elongate openings in which header end portions of removable filter units are located.

The removable filter units each have header end formations intended to assist in achieving a necessary air seal between the filter unit and filter frame. Two seal arrangements are known, one being a clean-side seal configuration in which the seal abuts a clean side (generally an upper side) of the filter frame and the other being a dust-side seal configuration in which the seal acts against the dust or underside of the filter frame.

The use of a clean-side seal configuration is well established particularly in relation to sub-assemblies of the type which utilize flexible, e.g. fabric type, filter units. In contrast, a dust-side seal configuration has been common for sub-assemblies of the type which utilise substantially rigid filter units.

A dust-side seal configuration is inherently potentially superior insofar as differential air pressures arising in use will tend to result in improvement of the sealing effect. However, a problem arises in that in order to remove a filter unit which is sealed to the underside of the filter frame it is necessary to gain access to the dust ridden part of the filter assembly. If a manhole access is conveniently available this may not be too difficult but in many cases, say when the filter units are used in a large dust silo, access is not at all easy or realistic. The use of a clean-side seal configuration therefore would appear potentially advantageous in facilitating periodic removal of filter units for replacement or inspection.

The use of a clean-side seal configuration has been employed successfully in the case of fabric type filter units, for which the filter material is able to deform readily and assist in achieving a seal, but unexpected difficulties have arisen when attempting to use this seal configuration for filter units of the substantially rigid type. To achieve a seal each filter unit of a substantially rigid type needs to be formed with a header portion having a smooth machined underside, which extends peripherally around the outside of a main body portion of the filter unit, for bearing against a sealing gasket; difficulty is experienced in machining the underside satisfactorily and without damage to the integral filtration walls of the main body portion of the filter unit.

The present invention seeks to provide a removable filter unit, filter frame and filter sub-assembly which exhibits or enables realization of the aforedescribed benefits of the conventional clean-side seal configuration without the aforedescribed disadvantages.

In accordance with one of its aspects the present invention provides a filter sub-assembly comprising a filter frame having a plurality of removable filter units sealingly secured thereto, said filter frame comprising a support frame structure and a selectively removable seal frame structure, the support frame structure having a plurality of openings through each of which a filter unit is arranged to extend, and each opening having support means associated therewith to support a filter unit with a header portion thereof arranged to lie in the region of that opening, the seal frame structure comprising apertures to align with apertures in the filter units for air flow therethrough, filter unit seal means to provide an air tight seal between boundary portions of the seal frame structure and confronting surfaces of the respective filter units, and clamping means whereby the removable seal frame structure may be caused to bear against the header end portions of the filter units to compress the seal means and provide an air tight seal between the filter units and filter frame.

The sub-assembly may comprise frame seal means arranged for providing an air tight seal between the support frame structure and the seal frame structure. The frame seal means may comprise a gasket compressible between the support frame structure and the seal frame structure.

The filter units may each comprise a main body portion of filtration material and a header portion which extends peripherally outwards of the main body portion of the filter unit at one end of the main body portion. The header portion preferably has an axially outwardly facing seal face, i.e. a face which extends around the main opening of the body portion of the filter unit and faces away from the header portion in a direction opposite that in which the body portion extends from the header portion.

The support means associated with an opening may be arranged for engagement with an underside of an outwardly extending filter unit header portion.

Seal means may be carried by the removable filter units, secured or securable to seal faces thereof or seal means may be carried by the seal frame structure.

Preferably the clamp means acts between the seal frame structure and the filter units directly to draw the latter towards an underside, i.e. dust side surface of the seal frame structure and thereby compress the seal means for creation of an air tight seal. Alternatively, however, the clamp means may be arranged to draw the seal and support frame structures towards one another indirectly to cause compression of the seal means by clamping of the header ends between the frame structures.

In accordance with another of its aspects the present invention provides a filter unit comprising a main body portion and an integral header portion each of which portions is formed of a substantially rigid material, the header portion being arranged at one end of the main body portion and comprising a seal face which faces in a direction opposite that in which the main body portion extends from the header portion, and the header portion having a greater cross-sectional dimension than the main body portion in a plane perpendicular to the length of the filter unit. Preferably the header portion has formed integral therewith clamp means structure, such as a nut, to receive a clamp bolt.

The seal face of the header portion may be in a plane perpendicular to the axial length of the filter unit or may lie inclined relative thereto.

The filter unit may be of a kind formed from powdered particles for example of plastics, metal or glass which are bonded together by a sintering operation to form a substantially rigid microporous material. The seal face of sintered material may be a machined surface to assist that surface in co-operating with seal means to achieve a seal therebetween. Clamp means structure such as a bolt may be incorporated into the moulded powdered material prior to sintering.

Embodiments of the present invention will now be described, by way of example only, with reference to the accompanying diagrammatic drawings in which:

FIG. 3 is an end view of the frame of FIG.

FIG. 4 is a front view of a filter unit in accordance with the present invention;

FIG. 5 is a side view of the filter unit of FIG. 4;

FIG. 6 shows in detail a part of the filter unit of FIGS. 4 and 5;

FIG. 7 is a front view of part of a filter sub-assembly comprising the frame of FIGS. 1 to 3 and a plurality of the filter units of FIGS. 4 to 6 in part exploded form;

FIG. 8 is a side view of the assembly of FIG. 7;

FIGS. 9 and 10 are respectively front and side views of the assembly of FIGS. 7 and 8 in an assembled condition.

Figure 1:
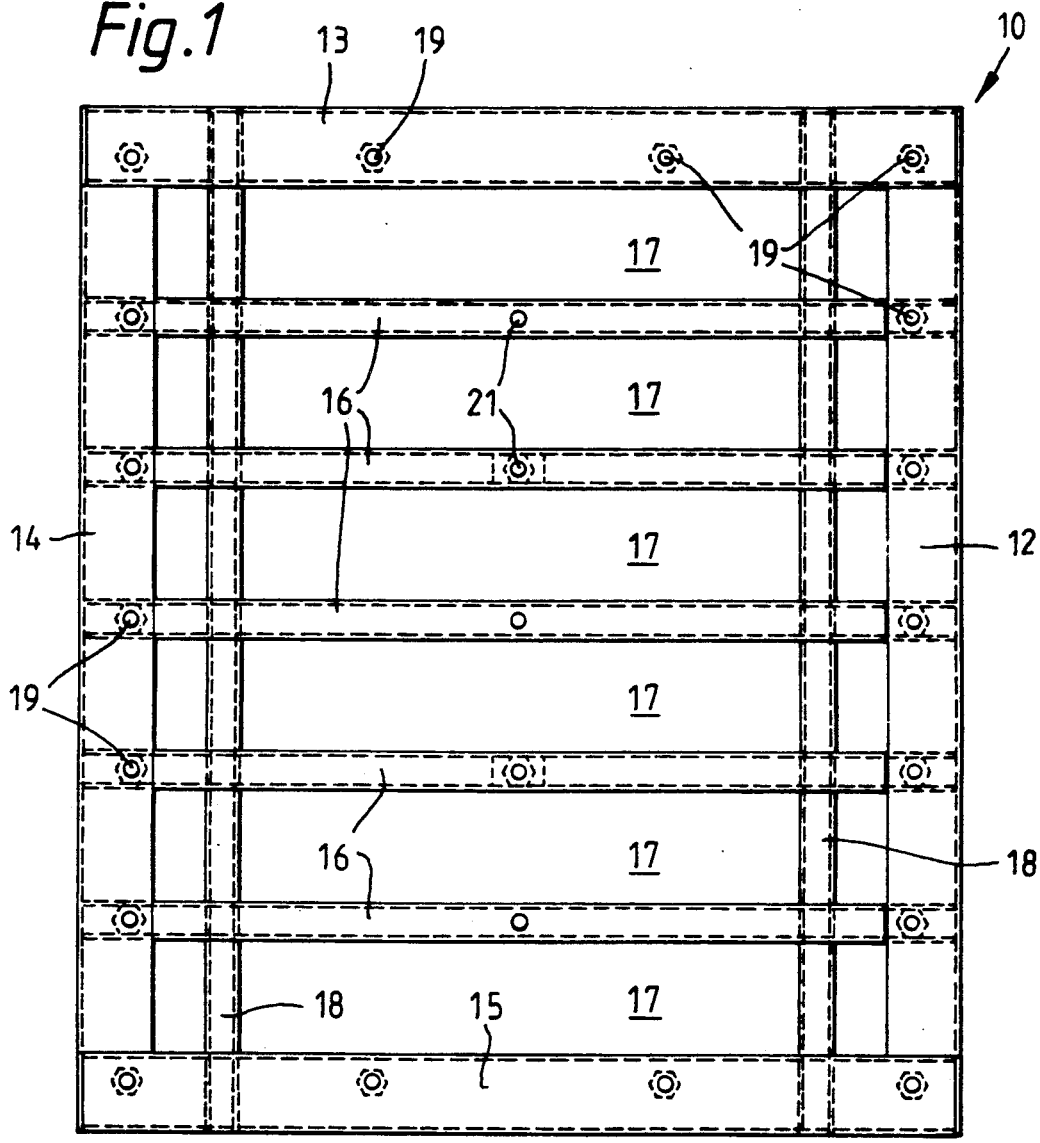
FIG. 1 is a plan view of a filter unit support frame structure in accordance with the present invention.
Figure 2:
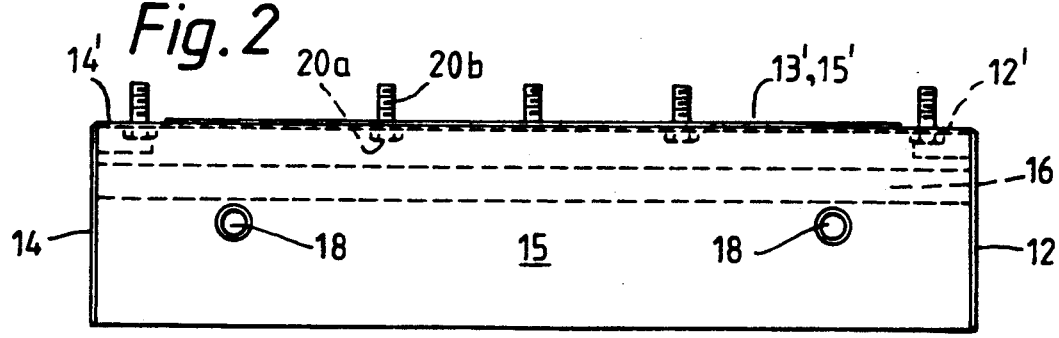
FIG. 2 is a side view of the frame of FIG. 1.

A filter sub-assembly for installation in the air flow path defined by the housing of a filter assembly comprises a filter frame a part 10 of which is shown in FIGS. 1 to 3 and six filter units 9.

The filter frame comprises a support frame 10 (see FIGS. 1 to 3) and a seal frame 11 (see FIGS. 7 and 8) locatable relative to the support frame 10.

The support frame 10 is of a generally rectangular form and comprises four edge members 12,13,14,15 which are adapted for installation in fluid tight manner against the internal walls of a filter housing (not shown).

The support frame comprises five cross members 16 arranged uniformly spaced apart to extend parallel with one another from one longer edge member 12 to the opposite edge member 14, the cross members thereby co-operating with the shorter edge members 13,15 to define six filter unit apertures 17 each of a rectangular shape. The frame additionally comprises a pair of parallel support bars 18 which extend between the shorter edge members 13,15; these bars 18 are spaced apart by a distance which corresponds with the width of the main body portion of a filter unit 9.

A plurality of bolts 19 are secured to the edge members 12 to 15 at uniformly spaced positions, with the bolt heads 20a being welded to underside surfaces of the edge members and the screw-threaded portions 20b extending upwards through the members. The cross members 16 are each similarly provided with a bolt 21 at their mid-length positions. The purpose of the bolts 19 and 21 is described below.

The filter units 9 each comprise a header portion 22 from which depends an integrally formed body portion 23. The body portion comprises a plurality of parallel passages 24 each sealed at a lower end 25 of the body portion and open at the upper, header end portion. The header and body portions are formed integrally into a substantially rigid and self-supporting structure by moulding powdered plastics material to the required shape and then subjecting it to a sintering operation. One such technique for forming a filter unit is described in more detail in the specification of German Patent Specification DE-A-2807159.

The header portion 22 has a greater dimension than the body portion 23 both as considered in relation to the width of the body portion as illustrated in FIG. 4 and the thickness of the body portion as illustrated in FIG. 5. The width (length) and thickness of the header portion are arranged to be slightly less than the size of the rectangular apertures 17 whereby each filter unit may be inserted into the support frame 10 to lie (below the level of the upper surfaces 12' to 15' of the edge members 12 to 15) with its header portion within a rectangular aperture 17 and with end regions 26 of each header portion resting on the support bars 18.

An upper face 27 of each header portion, being a surface which faces axially outwardly in a direction opposite that in which the body portion 23 extends from the header portion 22, is machined flat and carries an annular sealing gasket 28 of generally rectangular form having an opening for alignment with the upper ends of the filter passages 24.

The end regions 26 of each header portion have a nut 29 moulded integrally therewith and positioned co-axially of a passage 36 which opens at the upper face 27 of the header portion.

The lower end 25 of the filter unit body portion carries a channel member 30 which serves to locate that end of the filter relative to a location bar (not shown) of a filter housing and thereby restrain excess sideways movement as considered in the plane of FIG. 5.

The filter frame additionally comprises the seal frame 11 in the form of an apertured sealing plate 31 (see FIG. 7). The plate 31 is formed, in this embodiment, with six rows of circular apertures (not shown), each row being alignable with the filter unit apertures 17 of the support frame, but each of a smaller size corresponding generally to the size of the plurality of openings at the upper ends of the filter unit passages 24. The plate 31 additionally is formed with circular holes at positions corresponding to the positions of the bolts 19,21 extending upwards from an upper surface of the seal frame. The frame further comprises an annular frame gasket 32 of a shape corresponding to that of the upper surfaces 12' to 15' of the edge members 12 to 15. The sealing plate 31 and the gasket 32 each have an overall rectangular shape the dimensions of which are slightly less than those of the support frame 10 so that they may readily be positioned in and removed from a filter housing.

FIGS. 7 and 8 show the filter sub-assembly in an exploded form corresponding to an interim stage in construction of the assembly. These Figures show a filter unit 9 resting upon one of the pair of support bars 18, and it will be seen that in this condition the top of the sealing gasket 28 does not protrude above the top face of the support frame 10. The aforedescribed frame gasket 32 is arranged to be interposed between the support frame 10 and seal frame 11 and is compressed therebetween (see FIGS. 9 and 10) by means of nuts 33 which are screwed onto the bolts 19,21.

Figure 10:
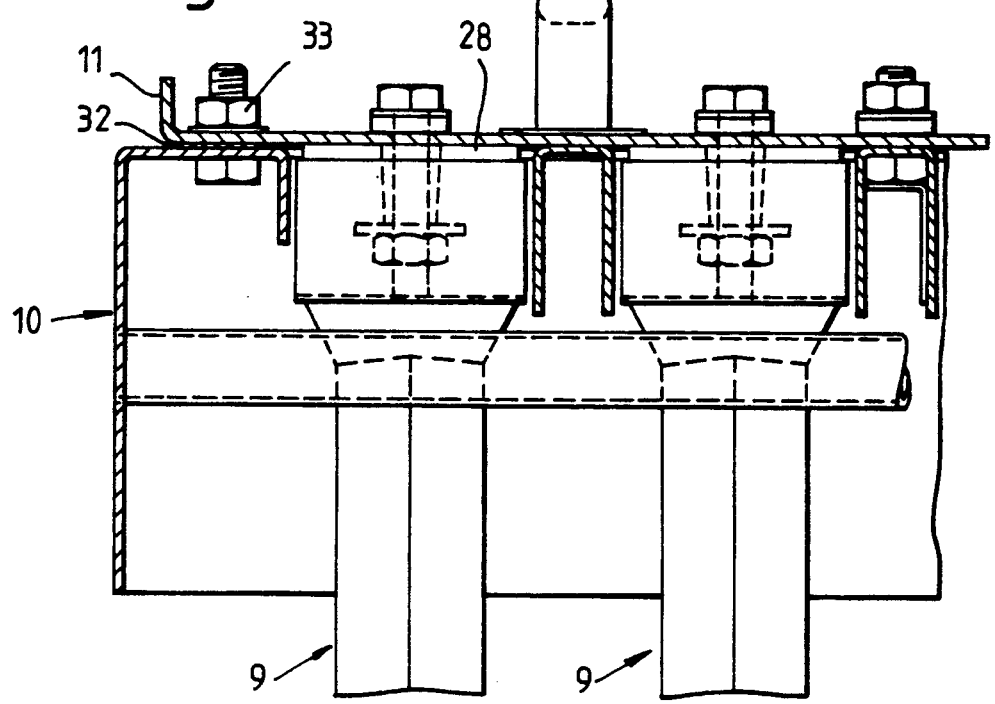

In a subsequent stage of assembly filter unit bolts 34 are passed through apertures (not shown) in the seal plate 11 to engage the nuts 29 embedded in the filter unit header portions. This draws the filter units upwards to lift them from support by the support bars 18 and to compress the respective sealing gaskets 28 as also seen in FIGS. 9 and 10.

It will be appreciated that in the assembled filter sub-assembly, the filter units are sealed to the sealing plate by the interposed gaskets 28 and that the sealing plate is sealed to the support frame by the frame gasket 32. The support frame is arranged in sealing contact with a filter housing and thus all gas flow through the housing must pass through the filtration material of the filter units 9.

It will also be appreciated that the inspection and/or replacement of a or each filter unit can be effected readily from the upper, clean side of the filter sub-assembly. This is achieved by first unscrewing the bolts 34 to allow the filter unit header portion to lower down onto and be supported by the support bars 18. The nuts 33 are then undone to allow the seal plate 11 and frame gasket 32 to be removed, whereupon the or each filter unit can then be lifted out of the assembly. A replacement or inspected filter unit is then positioned on the supports bars 18 and the aforedescribed assembly procedure is repeated to bring the filter units into sealing contact with the seal plate.

It is not essential that the seal plate and header end portions 22 of the filter units be clamped directly to one another. In an alternative arrangement the seal plate may be clamped, for example by means of clamp nuts and bolts, to the support frame 10 to cause compression of the interposed header gaskets 28. In this case the upper surfaces 12' to 15' of the edge members are positioned to be at a level appropriate relative to the level of the header gaskets 28 to ensure that the frame gasket 32 and header gaskets 28 are simultaneously compressed to the required extent as the seal plate is clamped down onto the support frame.

Figure 11:
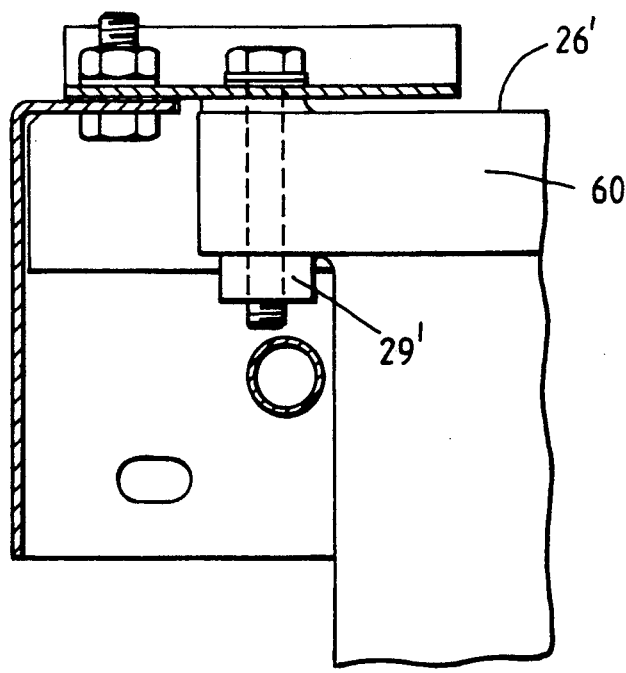
FIG. 11 shows part of a filter sub-assembly in accordance with another embodiment of the invention.

In arrangements such as that shown by FIGS. 1 to 10 it is not essential that each header end portion 22 be formed with integral nuts 29. Each end region 26' (see FIG. 11) may be provided with a metal reinforcing shoe 60 and a clamp nut 29' may be welded or otherwise secured to that shoe without the need for integral moulding of the nut within the filter unit.

What I claim is:

1. A filter sub-assembly comprising
   a filter frame for holding a plurality of elongate filter units, each unit having an aperture at one end thereof and a header portion adjacent said aperture, said filter frame having said plurality of filter units removably and sealingly secured thereto,
   said filter frame comprising a support frame structure and a selectively removable seal frame structure, the support frame structure having a plurality of openings through each of which a filter unit extends in a direction so that a flow of air thereover causes unfiltered air to impinge on the outer surface of each filter unit; each opening having support means to support a respective filter unit with said header portion thereof being held in the region of the respective opening,
   the seal frame structure comprising apertures to align with the apertures of the filter units for air flow therethrough,
   filter unit seal means to provide an air tight seal between the seal frame structure and confronting surfaces of the respective filter units,
   clamp means for clamping the seal frame to the filter frame whereby the header end portions of the filter units may be caused to bear against a dust side surface of the removable seal frame structure to compress the filter unit seal means and provide an air tight seal between the filter units and filter fame with the header portions of the filter units therebetween.

2. A filter sub-assembly according to claim 1 wherein the header portion of each unit has an outwardly extending portion and the support means of each opening is arranged for engagement with an underside of said outwardly extending filter unit header portion to provide at least temporary support until the clamp means causes the header portion to bear sealingly against the seal frame structure.

3. A filter sub-assembly according to claim 1 wherein part of said clamp means is incorporated integrally into the material of the header portion.

4. A filter sub-assembly according to claim 1 and comprising frame seal means arranged for providing an air tight seal between the support frame structure and the seal frame structure.

5. A filter sub-assembly according to claim 4 wherein said frame seal means comprises a gasket compressible between the support frame structure and the seal frame structure.

6. A filter sub-assembly according to claim 1 and comprising the filter units having a main body portion of filtration material and said header portion has a surface which extends peripherally outwards of the main body portion at one end thereof.

7. A filter sub-assembly according to claim 6 wherein the header portion has an axially outwardly facing seal face which faces away from the header portion in a direction opposite that in which the body portion extends therefrom.

8. A filter sub-assembly according to claim 1 wherein the header portion of at least one of said filter units has a metal shoe provided thereon.

9. A filter sub-assembly according to claim 8 wherein each said shoe has associated therewith means forming part of said clamp means.

10. A filter sub-assembly comprising
    a filter frame for holding a plurality of elongate filter units, each unit having an aperture of one end thereof and a header portion adjacent said aperture, said filter frame having said plurality of filter units removably and sealingly secured thereto,
    said filter frame comprising a support frame structure and a selectively removable seal frame structure, the support frame structure having a plurality of openings through each of which a filter unit extends, and each opening having support means to support a respective filter unit with said header portion thereof being held in the region of the respective opening,
    the seal frame structure comprising apertures to align with the apertures of the filter units for air flow therethrough, filter unit seal means to provide an air tight seal between the seal frame structure and confronting surfaces of the respective filter units, and clamp means, a part of which is incorporated integrally into the header portion, said clamp means being arranged to act between the seal frame structure and the filter units directly to draw the filter units against the dust-side surface of the seal frame structure whereby the removable seal frame structure may be caused to bear against a header end portions of the filter units to compress the filter unit seal means and provide an air tight seal between the filter units and filter frame;
    the support means of each opening being arranged for engagement with an underside of a filter unit header portion to provide at least temporary support until the clamp means causes the header portion to bear sealingly against the seal frame structure.

* * * * *